United States Patent
Liu et al.

(10) Patent No.: US 7,133,341 B2
(45) Date of Patent: Nov. 7, 2006

(54) SYSTEM AND METHOD FOR OPTICAL DISC DRIVE ADJUSTMENT

(75) Inventors: Tai-Sheng Liu, Taipei (TW); Lih-Hwa Kuo, Taipei (TW); Jung-Fang Chang, Taipei (TW); Sung-San Chang, Taipei (TW)

(73) Assignee: Lite-On IT Corporation, Taipei (TW)

( * ) Notice: Subject to any disclaimer, the term of this patent is extended or adjusted under 35 U.S.C. 154(b) by 591 days.

(21) Appl. No.: 10/705,435

(22) Filed: Nov. 10, 2003

(65) Prior Publication Data

US 2004/0105369 A1      Jun. 3, 2004

(30) Foreign Application Priority Data

Nov. 29, 2002   (TW) ................................. 91134889 A

(51) Int. Cl.
*G11B 7/00*      (2006.01)
(52) U.S. Cl. ................................. 369/53.19; 369/44.32
(58) Field of Classification Search ............. 369/44.32, 369/53.19
See application file for complete search history.

(56) References Cited

U.S. PATENT DOCUMENTS

| | | | | |
|---|---|---|---|---|
| 5,708,633 A | * | 1/1998 | Hollen et al. ............. | 369/44.11 |
| 5,764,611 A | * | 6/1998 | Watanabe ................... | 386/113 |
| 5,790,327 A | * | 8/1998 | Lee et al. ................... | 359/833 |
| 5,896,362 A | * | 4/1999 | Okuda et al. ............. | 369/53.19 |
| 6,678,222 B1 | * | 1/2004 | Schroder et al. ......... | 369/44.32 |
| 6,728,185 B1 | * | 4/2004 | Terashi et al. ............ | 369/53.28 |
| 6,862,257 B1 | * | 3/2005 | Lin et al. .................. | 369/53.28 |
| 6,925,039 B1 | * | 8/2005 | Yanagawa et al. ....... | 369/44.32 |
| 2002/0176342 A1 | * | 11/2002 | Worthington et al. .... | 369/53.31 |

* cited by examiner

*Primary Examiner*—Wayne Young
*Assistant Examiner*—Minerva Rivero
(74) *Attorney, Agent, or Firm*—Thomas, Kayden, Horstemeyer & Risley

(57) ABSTRACT

A system and method for adjusting optical drives. Rotating disc datum, and leader pin datum, must be adjusted to a specific position during a packaging process. An autocollimator according to the present invention senses tilt and sway of the rotating disc, outputting a first bright spot through a switch box to a monitor. In addition, an optimum tilt angle of the optical pickup head is obtained by a reader through calculation by a host, outputting a second bright spot through the switch box to the monitor. Therefore, the first bright is coincided with the second bright spot by a adjustment mechanism and according to picture switch by the switch box, reading optimum tilt angle adjustment. Furthermore, individual tilt angle of each optical pickup head is calculated by a host for satisfying adjustment of different tilt angles with different optical paths in reading CD and DVD discs.

13 Claims, 3 Drawing Sheets

SYSTEM AND METHOD FOR OPTICAL DISC DRIVE ADJUSTMENT

BACKGROUND OF THE INVENTION

1. Field of the Invention

The present invention relates to a system and method for optical disc drive adjustment, and in particular to obtain an optimum tilt angle using the persistence of vision effect during a packaging process.

2. Description of the Related Art

An optical pickup head of an optical disc drive, such as a DVD-ROM player, a DVD Player, or a CD-ROM drive, is an important component for data access. A tilt angle between an optical axis of the optical pickup head and an optical disc is defined for disc use. Obtaining a given tilt angle by precise component control, affects yield rates and product cost, requiring a mechanism to adjust the tilt angle with a given range.

FIG. 1 is a schematic diagram of a conventional structure of an optical disc drive. An optical disc drive comprises an optical pickup head 11, which accesses data from a optical disc, an accessing mechanism 12, which moves optical pickup head 11, a rotating mechanism 13, to maintain stable optical disc rotation, and a circuit board 14, which processes signals. Accessing mechanism 12 comprises two leader pins 15, providing primary and secondary movement respectively, which can be represented as a datum plane for optical pickup head 11. Generally, the height of one end of the primary leader pin is fixed, while the other end is adjustable. Conversely, one or both ends of the secondary leader pin are adjustable, and the datum plane is inclined by adjusting the relative height of both leader pins 15. When an optical disc is placed on rotating mechanism 13, the optical disc and the datum plane of both leader pins 15 form a tilt angle and sway generated by incorrect placement and the rotating mechanism 13 itself.

In the first adjustment procedure during the optical drive packaging process, optical drive components are adjusted with tilt angles and sway using an autocollimator at a workstation, comprising a rotary disc a spindle motor, on which an optical disc is placed. A reflector is located under the autocollimator to sense sway and tilt angle of the rotary disc and the datum plane thereof, represented by leader pins, supporting an optical pickup head, and are adjusted until the tilt angle is zero. In the second testing procedure, the jitter value of the optical pickup head is determined by a jitter meter at another workstation, in which a test disc is placed on the rotary disc to read radio frequency (RF) signals from the optical pickup head using the jitter meter, to determine whether jitter values are within a fixed range.

The adjustment procedures described above have several disadvantages, as described in the following. The jitter meter cannot immediately determine the optimum jitter value of the optical pickup head due to interference caused by noise. Additionally, because the jitter meter indicates the measured jitter value with sway it is difficult to determine whether the optimum jitter value has been obtained, and requires several measurements to obtain the optimum bottom jitter value. Further, different types of optical discs have different optical paths, and the datum plane of each must be adjusted before the optical pickup head can access them. Finally, tilt angle, sway and jitter adjustment cannot be performed simultaneously.

SUMMARY OF THE INVENTION

Accordingly, an object of the present invention is to provide a system and method for optical disc drive adjustment that simultaneously adjusts tilt angle, jitter, and sway using the persistence of vision effect.

Another object of the invention is to provide a system and method for adjusting optical drives, particularly for adjusting optical pickup head components to achieve optimum tilt angle in accordance with individual discrepancies.

According to the objects described, the present invention provides a system for adjusting optical disc drives. The system includes an optical disc drive component comprising a rotating disc and a reflector located on the rotating disc. The system further provides a monitor with a switch box, coupled thereto, an autocollimator, coupled to the switch box, located above the rotating disc, to sense the tilt angle of the reflector on the rotating disc. Signals are transmitted to the switch box to display a first bright spot on the monitor. A host is coupled to the switch box, to calculate the tilt angle of the optical drive component and transmitting signals to the switch box to display a second bright spot on the monitor. An adjustment mechanism for adjusting the optical drive component and switching signals from the autocollimator and the host using the switch box, enabling the first bright spot from the autocollimator to coincide with the second bright spot form the host.

The present invention further provides a method for adjusting optical disc drives. A tilt angle of a rotating disc located on top of a spindle motor is sensed by an autocollimator. A bright spot is output to a monitor through a switch box. A host calculates a tilt angle of an optical pickup head. Another bright spot is output to the monitor through the switch box. Finally, the autocollimator adjusts the first bright spot to coincide with the bright spot from the host to obtain an optimum tilt angle of the optical drive.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
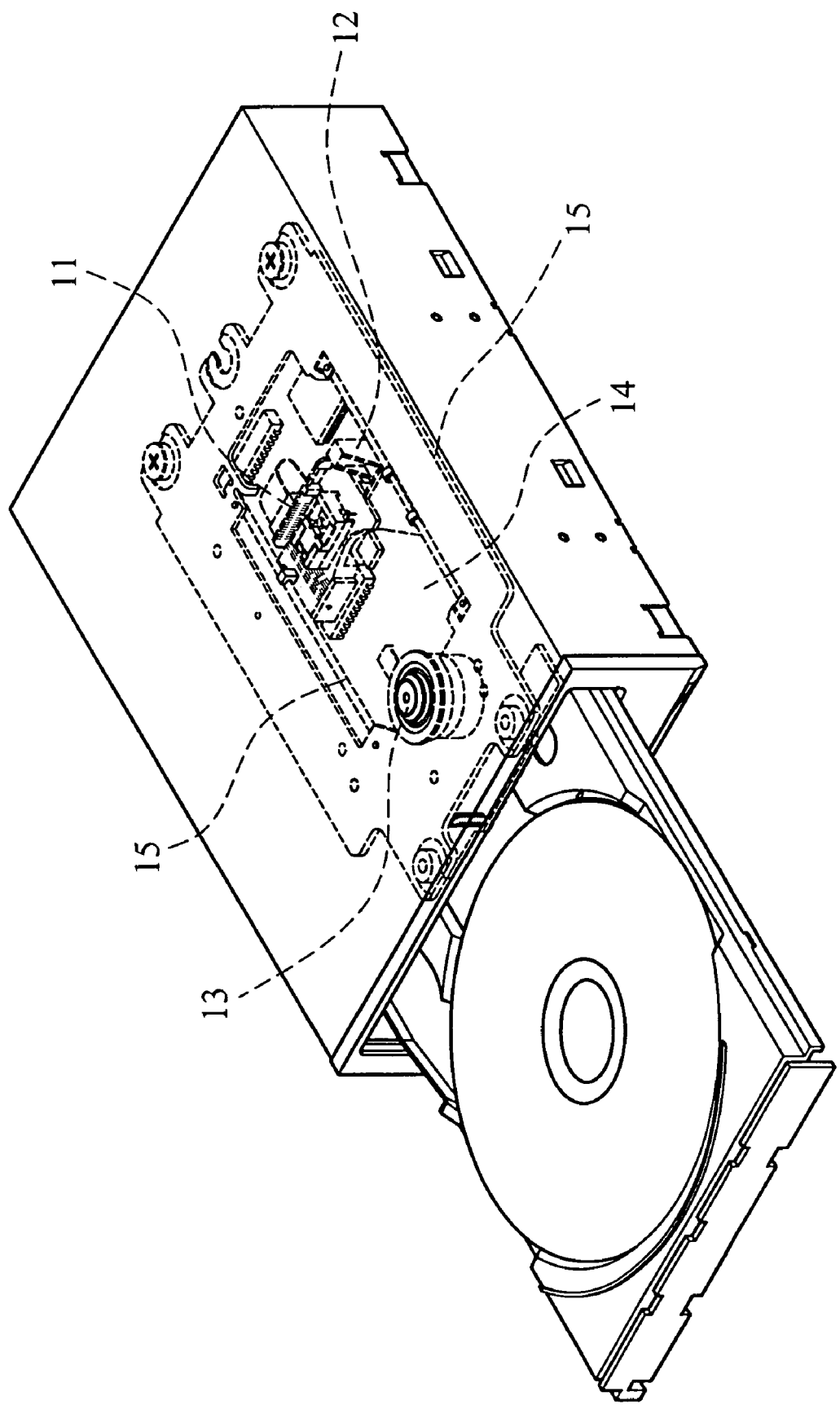
FIG. 1 is a schematic diagram of a conventional optical disc drive structure.
Figure 2:
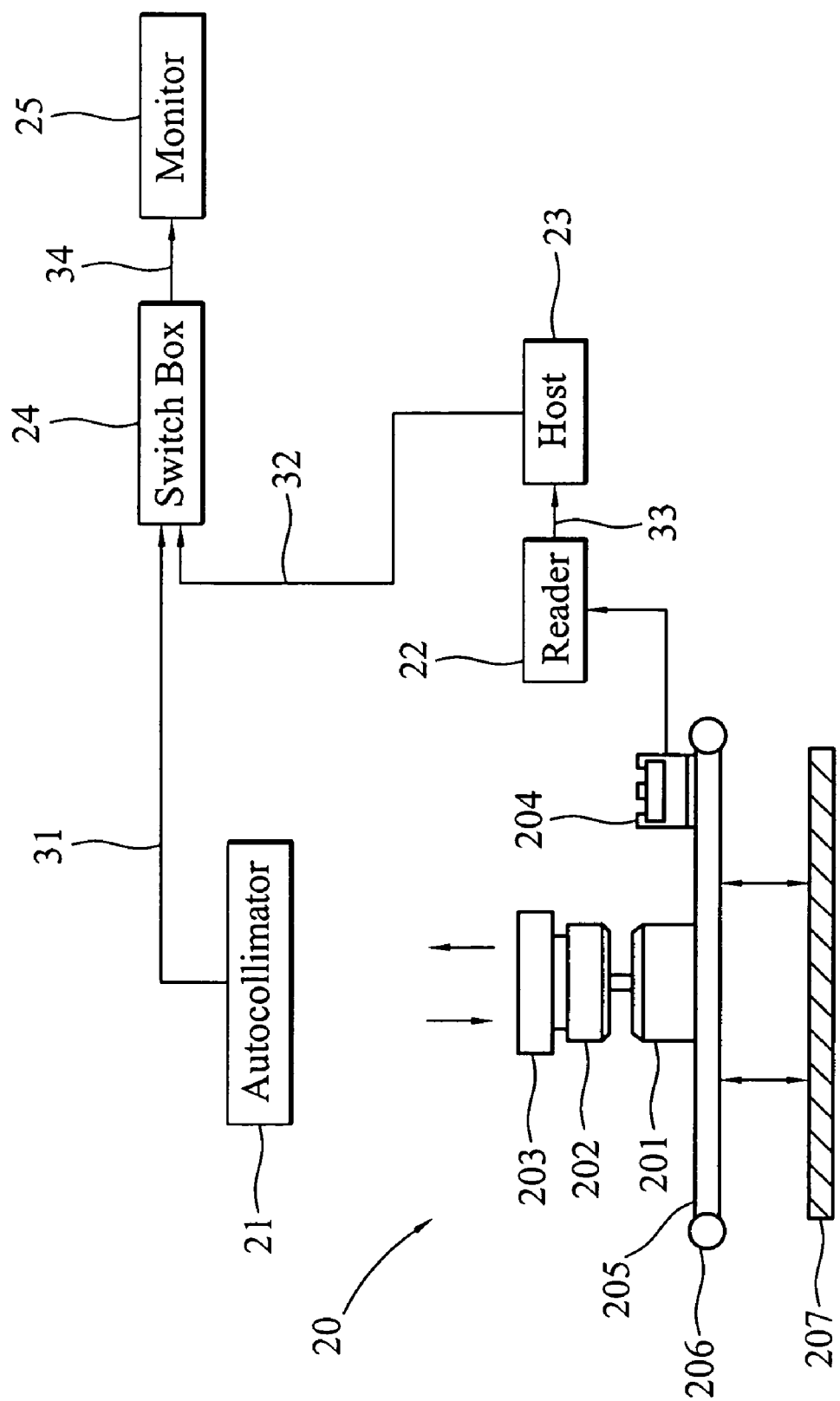
FIG. 2 is a schematic diagram showing the architecture of an adjusting system according to the present invention.

FIG. 2 is a schematic diagram showing the architecture of an adjusting system according to the present invention. The present invention performs an adjusting process on an optical disc drive component 20, comprising an autocollimator 21, a reader 22, a host 23, a switch box 24, and a monitor 25. Optical drive component 20, composed of a spindle motor 201 with a rotating disc 202 thereon, is located on a testing tool (not shown), in which spindle motor 201 is placed on a board 205 under which an adjusting mechanism 207 is located with leader pins at each side. An optical pickup head 204 is located on leader pins 206 for lead and movement and the bus line of spindle motor 201, together with that of optical pickup head 204, is connected to a PC control board for tilt angle, sway, and jitter adjustments.

In addition, the output of autocollimator 21 located above the rotating disc 202 with reflector 203 thereon is transmitted to the switch box 24 via a transmission line 31. Autocollimator 21 receives optical reflection signals from reflector 203 to sense a tilt angle of rotating disc 202. Reader 22 reads out a tilt angle when optical pickup head 204 obtains an optimum jitter value (provided by the optical pickup head manufacturer) using a bar code reader and the tilt angle is calculated using an algorithm by host 23 for a desired tilt angle. The output of host 23 is transmitted to switch box 24 via a transmission line 32 and that of switch box 24 is transmitted to the monitor 25 via a transmission line 34, in which switch box 24 is a TV tuner comprising two input signal sources, the autocollimator, and the host separately. In addition, switch box 24 can be switched, manually or electronically, to output one of the two input signals through an output port to be displayed on monitor 25, in which the monitor is a CRT (cathode ray tube) monitor or an LCD (liquid crystal display).

The bar code content represents the tilt angle when the optimum jitter value of the optical pickup head 204 is read by reader 22 and input to the host 23. Next, the bar code content is calculated using an algorithm based on the different optical paths required by a CD, DVD, or other optical disc through host 23, obtaining a tilt angle that enables optimum performance, and then a bright spot (referred to as a target point hereinafter) is output through switch box 24 to be displayed on monitor 25. The autocollimator 21 then senses the current tilt angle of rotating disc 202, emits a light beam to reflector 203 on rotating disc 202, and receives optical signals from the reflector 203, in which the reflected signals are output through switch box 24 to display a further bright spot (referred to as an adjustment point hereinafter) on the monitor 25. The adjustment point indicates the current inclined position of rotating disc 203, adjusted to overlap the target point completely to obtain an optimum tilt angle of optical drive component 20.

Figure 3:
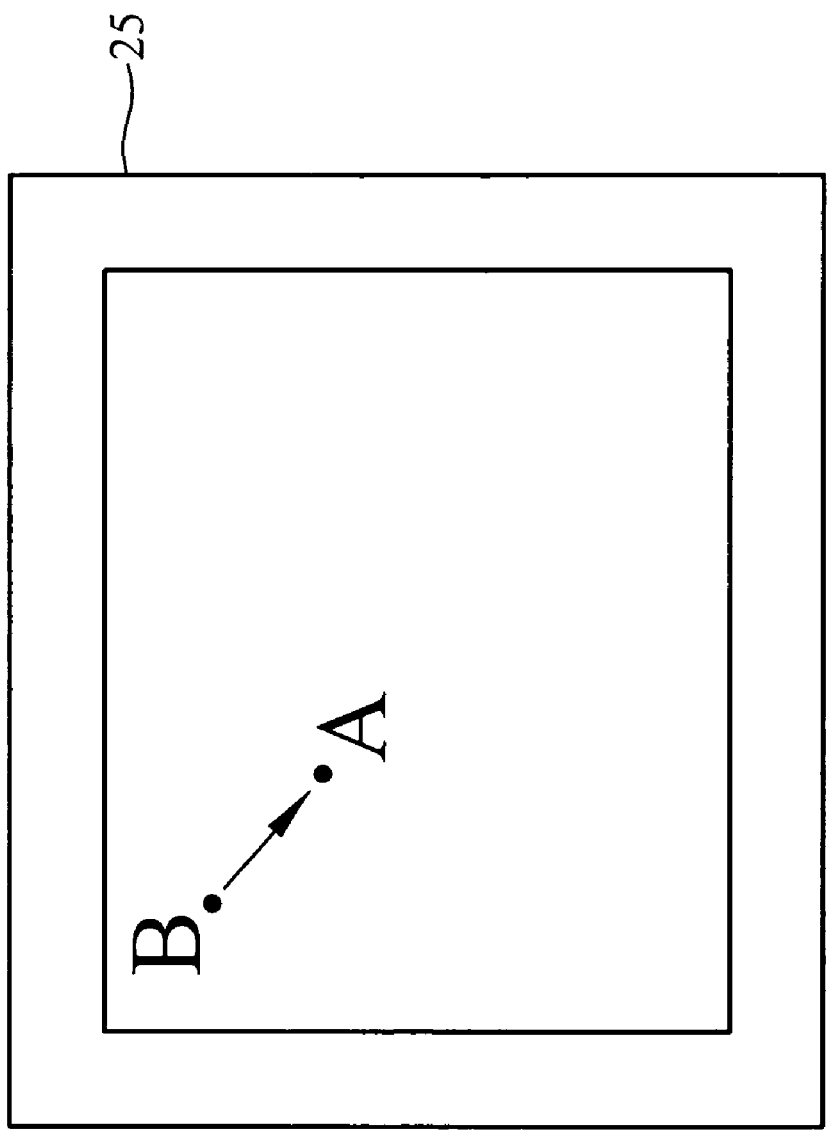
FIG. 3 is a schematic diagram showing bright spots from an adjusting system displayed on a monitor according to the present invention.

FIG. 3 is a schematic diagram showing a monitor through an adjusting system according to the present invention. According to the method of the present invention, a tilt angle with an optimum jitter value is obtained through host 23 and a first bright spot, represented as point A, is output to the monitor 25. In addition, autocollimator 21 senses optical signals from reflector 203 to obtain the tilt angle and sway of rotating disc 202 and a second bright spot, represented as point B, is output according to the tilt angle and the sway to be displayed on monitor 25. Optical drive component 20 is then adjusted by adjustment mechanism 207 to move point B to completely overlap point A. The points A and B, however, are switched by performing a high-speed switch operation using the persistence of vision effect. Conversely, if point A is obtained, displayed and its position marked first on monitor 25, point B is then switched by switch box 24 to display at another position on the monitor 25, in which both points are adjusted gradually by adjustment mechanism 207 until point A coincides with point B.

Accordingly, compared to conventional methods, the method of the present invention can adjust optical drives without the requiring two adjustment procedures at work stations, by displaying a bright spot calculated in accordance with a tilt angle and sway of rotating disc 202 and another from optical pickup head 204, calculated by host 23. Therefore, the two bright spots are switched by switch box 24 to be displayed on monitor 25, and are adjusted to coincide by adjustment mechanism 207, thus enabling faster adjustment of optimum tilt angles during the packaging process. In addition, conventional methods only adjust a rotating disc and a datum plan of leader pins to the same datum plane. Put simply a jitter meter determines whether a jitter value is within a certain range when a value of the tilt angle is zero, and is unable to adjust the tilt angle to meet the requirements of different optical paths required by different types of optical discs, CDs and DVDs, for example. Nevertheless, the present invention obtains different desired tilt angles according to the optical paths of different types of optical discs using an algorithm stored in host 23 after reading tilt angles with optimum jitter values obtained by optical pickup head 204, and establishes a database to compensate for differences between individual components of an optical disc drive and performing adjustment operations to achieve optimum tilt angles.

Thus, the advantages of the method and system of the present invention are that bright spots are displayed on a monitor using the persistence of vision effect, enabling operators to recognize whether an optimum tilt angle of an optical disc drive is obtained. Next, a desired tilt angle required by the leader pins and a packaged rotating disc are adjusted in accordance with a tilt angle with an optimum jitter value obtained from each optical pickup head (for example, different optical paths are required when an optical pickup head reads CD or DVD discs). Finally, different positions of tilt angles are acquired by a host and a database is established with different algorithms to satisfy requirements of each optical pickup head.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for adjusting optical disc drives, comprising:
   an optical disc drive component, comprising a rotating disc and a reflector located on the rotating disc;
   a monitor;
   a switch box, coupled to the monitor;
   an autocollimator, coupled to the switch box, located above the rotating disc, for sensing a tilt angle of the reflector on the rotating disc and transmitting signals to the switch box to display a first bright spot on the monitor;
   a host, coupled to the switch box, for calculating the tilt angle of the optical drive component and transmitting signals to the switch box to display a second bright spot on the monitor; and
   an adjustment mechanism for adjusting the optical drive component and switching signals from the autocollimator and the host using the switch box, enabling the first bright spot from the autocollimator to coincide with the second bright spot from the host.

2. The system as claimed in claim 1, wherein the switch box is a TV tuner.

3. The system as claimed in claim 1, wherein the monitor is a cathode ray tube monitor.

4. The system as claimed in claim 1, wherein the monitor is a liquid crystal display.

5. A system for adjusting optical disc drives, comprising:
   an optical disc drive component, comprising an optical pickup head, a rotating disc, and a reflector located on the rotating disc;
   a monitor;
   a switch box, coupled to the monitor;
   an autocollimator, coupled to the switch box, located above the rotating disc, for sensing a tilt angle of a reflector on the rotating disc, and transmitting signals to the switch box to display a first bright spot on the monitor;

a reader, reading a bar code of the optical pickup head;

a host, coupled to the reader and switch box, calculating the tilt angle of the optical drive component according to the bar code content and transmitting signals to the switch box to display a second bright spot on the monitor; and an adjustment mechanism, adjusting the optical drive component and switching signals from the autocollimator and the host using the switch box to, enable the first bright spot from the autocollimator to coincide with the second bright spot from the host.

6. The system as claimed in claim 5, wherein the bar code content of the optical pickup head refers to a tilt angle with an optimum jitter value of the optical pickup head.

7. The system as claimed in claim 5, wherein the reader is a bar code reader.

8. The system as claimed in claim 5, wherein the switch box is a TV tuner.

9. The system as claimed in claim 5, wherein the monitor is a cathode ray tube monitor.

10. The system as claimed in claim 5, wherein the monitor is a liquid crystal display.

11. A method for adjusting optical disc drives, comprising steps of:

sensing a tilt angle of a rotating disc located on top of a spindle motor using an autocollimator;

outputting a first bright spot according to the tilt angle from the rotating disc to a monitor through a switch box;

calculating a tilt angle of an optical pickup head through a host;

outputting a second bright spot according to the tilt angle from the optical pickup head through the switch box; and adjusting the first bright spot to coincide with the second bright spot to obtain an optimum tilt angle of the optical drive.

12. A method for adjusting optical disc drives, comprising steps of:

sensing a tilt angle of a rotating disc located on the top of a spindle motor using an autocollimator;

outputting a first bright spot according to the tilt angle from the rotating disc to a monitor through a switch box;

reading a bar code set on an optical pickup head using a reader;

calculating a tilt angle of the optical pickup head according to the bar code content through a host;

outputting a second bright spot according to the tilt angle from the optical pickup head through the switch box; and adjusting the first bright spot to coincide with the second bright spot to obtain an optimum tilt angle of the optical drive.

13. The method as claimed in claim 12, wherein the bar code content refers to a tilt angle with an optimum jitter value of the optical pickup head.

* * * * *